Nov. 15, 1960 S. D. NOBLE 2,960,578

POLARIZED VIBRATION RECORDING MEDIUM AND SYSTEM THEREFOR

Filed April 23, 1954

STUART D. NOBLE,
INVENTOR.

Huebner, Beehler,
Worrel & Herzig.
Attorneys.

By: Vernon D. Beehler

United States Patent Office 2,960,578

Patented Nov. 15, 1960

2,960,578

POLARIZED VIBRATION RECORDING MEDIUM AND SYSTEM THEREFOR

Stuart D. Noble, 3207 Winnie Drive, Hollywood 28, Calif., assignor of ten percent to Vernon D. Beehler, Los Angeles, Calif.

Filed Apr. 23, 1954, Ser. No. 425,084

12 Claims. (Cl. 179—100.4)

The invention relates to the preparation of permanent recordings of audible or other vibrations on a suitable transparent medium in such fashion that the record can be immediately photoelectrically reproduced as audible sound or for electromechanical analysis or, if desired, such record can be viewed by optical means for study and analysis.

More particularly the invention has reference to the use of a transparent sheet or strip of material upon which a progressively undulating track is impressed by a suitable stylus which reproduces vibrations from some selected source, the track being one capable of being passed between optically polarizing plates with their axes oriented to block the passage of light through the material except where the material has been deformed from its normal plane by the action of an indenting stylus, in which areas the material is transparent to light and thus provides a photoelectrically reproducible sound track or one suitable for visual examination.

The art of reproducing vibrations and particularly sound vibrations has employed, for a long time past, the use of some suitable medium upon which has been cut or indented an undulating track conforming in its undulations to vibrations produced by sound and cut into the track by a cutting needle. The medium into which the track has been cut has been some composition of wax or one of the plastics later developed, the medium being provided in sundry forms such as disks, cylinders and tapes. Because of the necessity for cutting into the material and because of the further necessity of having to have the medium in which the track is recorded of sufficient body to be handled and preserved, tapes, disks, cylinders, and the like have been relatively thick and bulky and have necessitated use of a considerable mass of material when compared to the depth of material actually required by the cut-out track.

It is therefore among the objects of the invention to provide a new and improved system and apparatus for recording sound and other vibrations which is accurate to a necessary degree and inexpensive.

Another object of the invention is to provide a new and improved vibration recording and reproducing system which is capable of making a permanent reproducible record on thin, narrow tape which can be immediately reproduced, either visually as by projection, or audiby, as by means of a photoelectric pickup without any intermediate processing steps being necessary.

Still another object of the invention is to provide a new and improved vibration recording and reproducing system suitable for sound and other vibrations whereby an undulating track can be produced on some inexpensive medium in such fashion that it can be used without intermediate processing steps for reproduction in various ways as, for example, by enlarged projection on a screen, by enlarged or contact printing on some suitable printing paper, or by reproduction and electrical or optical analysis through appropriate electrical systems wherein a photoelectric cell is employed.

Still another object of the invention is to provide a new and improved sound vibration recording and reproducing system whereby use is made of polarizing plates for the reproduction of impressions made on a transparent tape and wherein the reproduction of the vibrations is of high quality, wide dynamic range, permanent, and capable of immediate reproduction.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1*a* is a fragmentary front elevational view of the tip of a stylus capable of impressing a laterally undulating track on some suitable medium.

Figure 1*b* is a fragmentary side elevational view of the stylus shown in Figure 1*a*.

Figure 2 is a plan view of a portion of the track traced by a laterally undulating stylus and showing a mask by means of which one side of the track may be caused to act as a "variable-area" sound track.

Figure 3*a* is a fragmentary front elevational view of a tip of a stylus adapted particularly for vibration in a longitudinal direction.

Figure 3*b* is a fragmentary side elevational view of the stylus shown in Figure 3*a*.

Figure 1B:
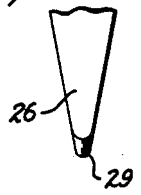

In the practice of the invention use is made of a special application of the phenomenon of optical polarization. It is well known that if a sheet or strip of transparent plastic material be properly located between polarizing plates, it can be cause to appear opaque over the entire area which lies between the polarizing plates as long as its surface is a uniformly plane surface. It has been found that if a needle or stylus be drawn across the surface of such a sheet of plastic material so as to scratch, indent or emboss a line, and the sheet then oriented between optically polarizing plates so as to be opaque, the scratched or indented line made by the stylus will appear transparent. A transparent line so produced lends itself readily to photoelectrical reproduction or visual study, and virtually any type of audible or other vibration can be recorded and reproduced in this manner.

By virtue of the unique characteristics of this system certain important advantages are gained. Because no processing is required between the time of recordation and reproduction, a substantial saving of time is effected, whereas in all photoelectrical recording systems, which by their nature rely on the use of light-sensitive coatings on tape or film, it is necessary to develop, fix, wash and dry the recording before it can be reproduced. In addition, the application of a light-sensitive emulsion to conventional film adds substantially to its cost, whereas in the present system no emulsion is required and a bare, untreated film of almost any type of low cost transparent plastic can be used without any processing before or after recordation. Furthermore, the method herein disclosed makes it possible to take full advantage of the well known virtues associated with optical type sound tracks, while reducing or even eliminating most of the disadvantages common to the various photoelectrical systems known in prior art, both for use in the recording and reproduction of sound and for use in various fields of vibration study and analysis.

For example, there has been produced a recording system wherein a film is coated with an opaque surface applied to a soft under-layer of gelatin. A recording stylus in the form of an obtuse angle cutting member is made to move vertically and produce a transparent track of varying width according to the amount of vertical movement imparted to the stylus. This transparent track is adapted for play-back without intervening processing by photoelectrical means. However, practical difficulties associated with producing the opaque coating on the film and attaining the highly precise dimensions essential to success of the system presented an insurmountable obstacle to the use of such a method. The present method achieves a similar end result but obviates the one real obstacle in the above-mentioned system by the elimination of any type of coating or opaquing film and reliance upon the simple phenomenon of polarization to create the necessary opacity merely during the period when the film passes through the reproducing area.

In the specific applications contemplated my system makes use of either of two methods of creating a photoelectrically reproducible sound track or optically visible record, as desired. In the one method, illustrated in Figures 1*a*, 1*b* and 2, a relatively broad and laterally undulating track is indented on transparent tape by means of a highly polished, round-edged stylus of duck-billed shape which is driven laterally by any suitable driving means such as a crystal cutting head or a magnetically driven cutting head.

The advancing face of the stylus is broad and of rather blunt profile so as to indent a wide shallow groove, and all contacting surfaces of the stylus are smooth, rounded and highly polished to insure free movement of the stylus and a polished, optically clear groove. The stylus is relatively thin and narrow in side view to reduce lateral resistance as it traverses an undulating course and to allow complete recordation of the desired vibrational frequencies at a relatively low groove speed. Advantages of the stylus of the present system become apparent when compared to a stylus as broad in side view as it is in front view which would require a groove speed several times as great to allow recordation of the same number of undulations per unit of time.

An undulating groove produced in this manner can be reproduced photoelectrically as a "variable-area" track if a mask be used during reproduction to cut off one side of the track, whereupon the remainder of the track will allow the passage of a varying amount of light as its boundary fluctuates from maximum to minimum deviation.

Figure 3A:
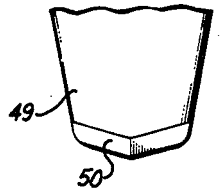
Figure 3B:
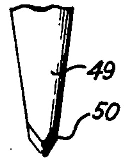
Figure 4:
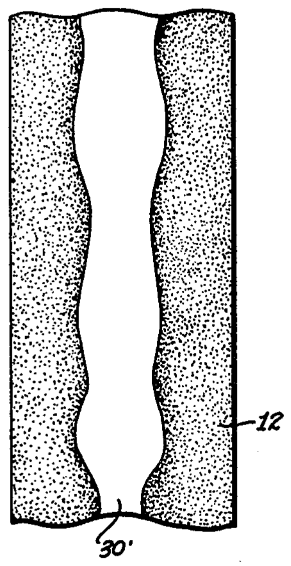
Figure 4 is a plan view of a portion of a symmetrical "variable-area" track made by the stylus tip of Figures 3*a* and 3*b*.

In the other broad application of my invention, Figures 3*a*, 3*b* and 4, use is made of an angular faced indenting stylus which is moved in a vertical plane in response to the incoming vibrational signal, and produces a symmetrical "variable-area" recorded track. Such a stylus is illustrated in Figures 3*a* and 3*b*. This stylus also has a broad face and a narrow, somewhat chisel-shaped cross-section to facilitate recordation of a wide frequency range at relatively low groove speeds. Such a stylus with a working edge of about 140 degrees included angle will produce a relatively great variation in groove width for a slight amount of vertical movement so that the driving element or cutting head and the associated electronic components of the system can be operated at a low energy level with consequent minimizing of distortion while producing a recorded groove of very great amplitude. Since the amount of variation in groove width directly affects the volume output or dynamic range of the recording, it is evident that such a system is capable of recording very large dynamic range with a low energy and minimum distortion driving force applied to the stylus. As is well known in the art, the photoelectric method of sound reproduction is capable of functioning with much larger dynamic ranges than a mechanical recording system can ordinarily produce, and use of the recording system herein proposed makes it possible to more nearly utilize the full useful range inherent in a photoelectrical method of reproduction.

To facilitate making the indented grooves described herein two methods of supporting the tape or film during the period of recordation have been employed. In one method the tape is supported on and driven by a resilient roller carrying an annular relief groove beneath the recording stylus. In this method the tape is supported in tension due to the slight predetermined tape tension introduced in the tape driving system and also by virtue of the tape being wrapped around the recording roller over more than half its circumference. This combination of tensions supports the tape in a state comparable to a stretched membrane over the relief groove and provides enough tension to allow the recording stylus to produce an undulating groove without displacing the tape. At the same time the relief under the point of recordation prevents the material of the recording roller coming in contact with the under side of the tape at this point and eliminates the danger of the sound groove being modified by the material structure of the roller. See co-pending application Serial No. 414,044, filed March 4, 1954.

In another method, which is suitable for recording both vertical as well as lateral undulations, the recording roller instead of having an annular relief groove in a resilient material is composed of a sandwich-like structure in which a relatively soft resilient material is laminated between two layers of relatively firm or even rigid material. Thus constructed the soft thin central layer forms a yieldable support beneath the stylus against which the tape rests, while the firm or even rigid material on either side of this central layer of soft material provides a substantial support for the outer edges of the tape and allows the recording roller to be driven positively by its engaging roller or shaft. By preference such a composite roller is constructed of a plastic material belonging to the "Plastisol" group which has some of the yieldability of rubber without the rapid resilience or bounce associated with rubber. This material can be obtained in varying degrees of hardness and is easily formed into various composite forms either by lamination of prepared sheets or by a two stage molding technique in which either the hard or the soft section of the roller is partially heat-cured, after which the remaining portion is added and the whole baked to complete cure, automatically forming a perfect bond between the layers.

The advantage of this material over rubber for this use lies in the fact that, whereas rubber has a definitely granular structure which acts to introduce extraneous noise into thin tape recordings made against it, the internal structure of the plastisols is virtually free of grain or other irregularities and provides a much better surface for support of the thin tape during recordation.

While the achievement of fine quality sound recording is one aim of the present system, it is not by any means the sole objective of such a method. In the measurement and analysis of all types of vibratory motions, whether associated with mechanical noise, seismological disturbances, either natural or artificially induced, as in oil prospecting, or in the study of various types of stress and agitation, such a system has definite advantages due to the fact that the recorded vibrations can be studied readily with low or high power magnification. Moreover, such a transparent record used in conjunction with the optical polarizing technique referred to above provides an ideal source for making photographic prints for permanent records.

Furthermore the system substantially as herein explained is readily adaptable to the needs of visual image transmission. A simple sheet of inexpensive plastic can function as either a positive or a negative in the photographic sense. If a sheet of transparent plastic be placed on a rotating drum and a continuous line be indented about its circumference, forming a closely spaced spiral by means of a lead screw, such a line can be modulated by means of a vertically undulating stylus, as shown in Figure 3*a* and Figure 3*b*, which is caused to oscillate in accordance with a varying signal produced by a simple scanning system. By this means a visual image can be transmitted and recorded without the use of photographic material on the receiving end and can be sent either as a positive or a negative, as desired. Such an image can be viewed at once by placing the recorded sheet between sheets of polarizing material or can be printed on photographic paper by contact or projection, if desired.

In one physical embodiment of the invention chosen for the purpose of illustration there is depicted an apparatus suitable for use in a system wherein vibrations are set up in a lateral direction. The system contemplates employment of a pay-out reel 10, rotatably mounted upon some suitable conventional support, and a take-up reel 11 similarly mounted. A tape or strip 12 is fed from the pay-out reel to the take-up reel over a roller 13. The means of moving the tape is not of material importance and may be any one of the accepted commercial means of passing a tape or strip from a take-up reel to a pick-up reel.

A sound recording head 14 is located adjacent the roller 13 and is provided with a stylus 15, the stylus being positioned so that it rests upon and is urged by gravity against a side of the tape 12 opposite from the side of the tape which is in contact with the roller 13. Rollers **13*a* serve to extend the tape over a greater portion of the circumference of roller 13**.

The roller 13 is freely rotatably mounted by means of a shaft 16 having a cap 17 to hold the roller in place, the shaft in turn being mounted upon some conventional support such as that upon which the reels are rotatably mounted, a showing of the support being omitted in the interest of brevity.

Figure 5:
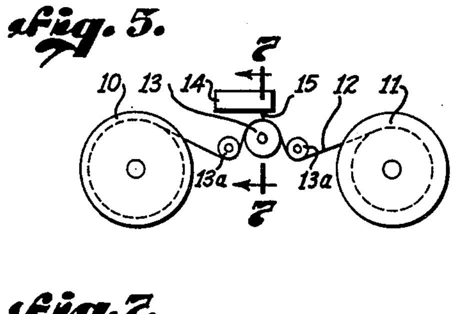
Figure 5 is a schematic view showing the means of passing a tape or strip from a pay-out roll to a pick-up roll past a sound recording head.
Figure 7:
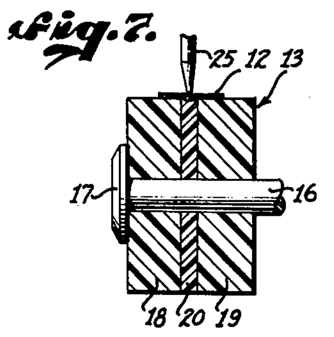
Figure 7 is a longitudinal sectional view taken on the line 7—7 of Figure 5.

The roller of Figure 7 is constructed as shown of disks 18 and 19 of some deformable semi-resilient material, the surface of which provides a frictional contact against the under side of the tape 12 as viewed in Figures 7 and 5. Between the disks 18 and 19 is a thinner and intermediate disk 20 of substantially the same material as the disks 18 and 19 but made more readily depressible. That is to say, the disk 20 may be of softer material than the disks 18 and 19, although of the same composition. When materials of a plastic nature are made of different densities, they can be readily welded together to form an integrally composed roller 13, the center portion of which is softer than the end portion.

Figure 8:
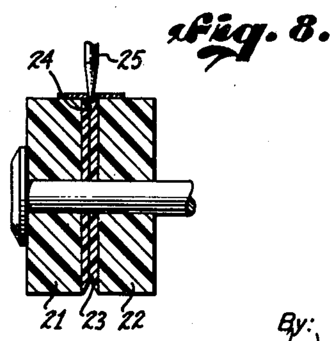
Figure 8 is a longitudinal sectional view similar to Figure 7 but employing a slightly different type of support for the tape.

Another form of roller is illustrated in Figure 8 wherein disks 21, 22, and 23 may be of the same material but wherein an annular groove 24 is provided in the disk 23 immediately beneath the axis of a stylus 25. The disk 23 can be a cylindrical roller of resilient material having an annular relief groove located beneath the recording stylus.

Figure 1A:
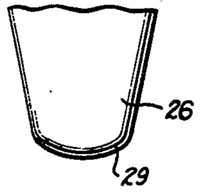
Figure 2:
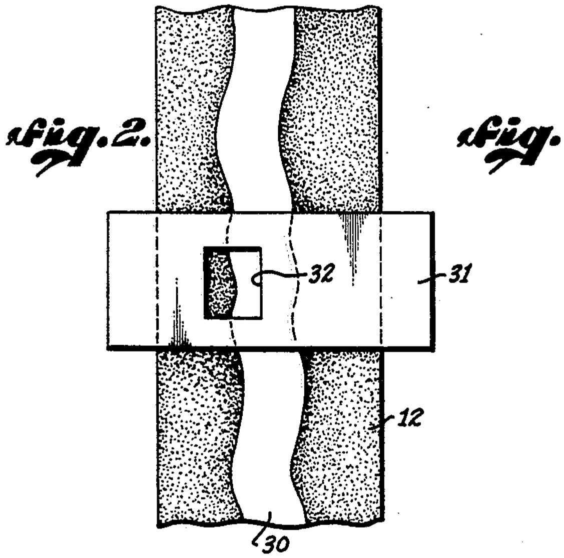

By use of the stylus 26 shown in Figures 1*a* and 1*b* in a laterally vibrating recording head 14, a tip 29 traces upon tape 12 a groove 30 having somewhat generally the shape illustrated in Figure 2, which undulating pattern is the result of a lateral vibration of the stylus while the tape 12 moves past the point of application of the stylus.

The tape is transparent or substantially transparent and can be of some one of the current commercial plastic films such as cellophane. In any event, the material of the tape must be deformable to a degree such that once deformed by application of the stylus, the tape will hold its deformed shape so that the groove or track 30 becomes a permanent record.

As the tape travels past the stylus, the track impressed upon the tape by the stylus undulates. The undulations will be the result not only of variations in the frequency of sound waves, but also the result of variations in amplitude of the sounds which account for the lateral vibrations of the stylus tip. Each side of the groove will have those undulations. Since, however, the groove is of uniform width, if a photoelectric means is employed to reproduce from the groove, one side of the groove must be obliterated so that the result will be a varying pattern, depending upon the character of vibrations induced upon the tape. To secure such a varying pattern a mask 31 may be employed having an aperture 32 therein with the aperture so located that it follows only one side edge of the groove 30.

Figure 6:
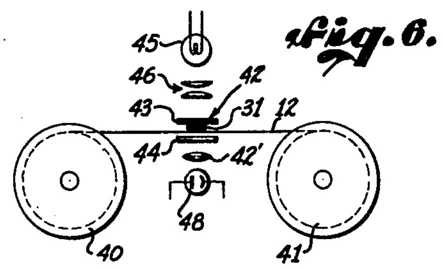
Figure 6 is a schematic view of a system or apparatus used in reproducing from the tape or strip on which a track has been impressed.

A schematic representation of a reproducing system is suggested in Figure 6. There shown is a pay-out roller 40 and a take-up roller 41 arranged in some suitable conventional means for passing the tape 12 past a reproducing station 42. The mask 31 is located at the reproducing station. Also at the reproducing station is an optically polarizing plate 43 on one side of the tape 12 and another optically polarizing plate 44 on the opposite side of the tape. It should be further noted that the polar axis of the plate 43 is opposed to the polar axis of the plate 44 so that in the absence of any intervening means for changing the direction of light passing through the polarizing plates, no light will pass therethrough.

A light source 45 is here shown as a lamp which emits light sending it through condenser lenses 46, thence through the polarizing plate 43, mask aperture 32 in the mask 31, polarizing plate 44, and thence through a focusing lens 42' to a photoelectric cell 48. Hence it will be noted that as light passes from the source 45 through the aperture or hole in the mask 31, the amount of light will vary continually depending upon the amount of area of the track 30 which appears in the aperture of the mask, this area being variable continually depending upon the directions and undulations of the side of the groove appearing under the aperture.

It should be noted further that although the material of the tape 12 is merely a transparent material, the tracing of a groove on that material will realign the molecules of the material so that the light after passing one polarizing plate 43 will be shifted in plane of vibration so as to be visible in the same form as the track upon emerging from polarizing plate 44. Hence the variations will be picked up by the focusing lens 42' and the photoelectric cell 48. Suitable reproducing media connected to the photoelectric cell 48 can be caused to reproduce the same variations impinging upon the photoelectric cell as the result of changes in the area on one side of the groove 30. A high quality sound may thus be produced.

With reference to the roller 13, as illustrated in Figure 7, it will be noted that although the disks 18 and 19 can be made reasonably hard so as to provide a friction grip upon the adjacent side of the tape, nevertheless the disk 20 can be made relatively softer sufficient to be depressed when the stylus is pressed against the tape. The softer material of the disk 20 therefore becomes comparable to the open annular groove or space 24 illustrated in Figure 8.

Another form of groove 30' is illustrated on the track 12 as shown in Figure 4. To produce such a progressively variable groove, a stylus edge 50 like that shown in Figures 3*a* and 3*b* may be used upon a stylus 49 set up to vibrate in a direction substantially longitudinal or axial with direction to the axis of the stylus. This is in contrast to the lateral motion already described.

The tape 12 may be passed over a roller 13 and under a recording head 14 in the manner already described in connection with Figure 5. In this instance, however, because the stylus vibrates longitudinally, the depth of the impression will vary, and because of the spread of the point 50, the side edges of the groove 30′ will have a symmetrical undulating pattern. Because the sides diverge and converge together, the over-all area of the groove 30′ will vary in proportion to the frequency and amplitude of the vibrations transmitted through the stylus.

In playing back or reproducing the vibrational effect impressed into the tape 12 by the groove 30′, no partially obliterating mask aperture is needed but only a conventional mask for blanking out anything but the track itself in a reproducing system suggested by Figure 6. Variations in the track created by changes in frequency and amplitude will thereby be transmitted to the photoelectric cell 48. The same system is employed as heretofore described in that the polarizing plates which would ordinarily blank out all light from the source to the photoelectric cell now admit a varying pattern of light because of the change in direction of the light vibrations created by the impression on the transparent tape 12. An extremely wide dynamic range can easily be recorded by this method since the obtuse V-shaped face of the indenting stylus produces a relatively wide variation in groove width for a relatively slight vertical displacement of the stylus. Because of the highly favorable ratio between stylus travel and resulting groove width, the stylus can be actuated at low energy levels with correspondingly high efficiency and low distortion through the electronic system and the recording head.

Should it not be desired to make use of a photoelectric system to reproduce the vibrations, it is clear that by use of the polarizing plates and the tape a film record may be made as by contact printing with the impressed tape serving as a negative. An enlarged easily viewed form of the undulating groove could be produced by similar photographic means for visual study and analysis at any type of vibrational record.

If it should be desired, a visual projection of the variations in either the groove 30 or 30′ could be produced by shining a suitable source of light through lenses and the polarizing plates and through the tape so that the changes could be projected on the screen or if preferred could be recorded in enlarged form on suitable printing paper.

Although most attention has been given here to reproduction of the vibrations in the form of sound and recording of the track as the result of sound vibrations, it can readily be appreciated that vibrations of any corresponding character can be recorded and then later reproduced by means other than sound systems. One obvious use of a device of this kind wherein many lengths of tape can be operated economically is in the making of recordations by the seismic system of oil exploration. In these exploratory processes vibrations are set up which are different from sound vibrations but which can be traced upon a tape in a similar fashion by use of styluses, like that shown in Figure 1*a* or that shown in Figure 3*a*. Should the resultant effect of the vibrating needle be very slight and no projecting system be available, the variations could further be studied by use of a microscope and a suitable light source projecting light through polarizing plates and the tape.

Very thin tape can be made use of in a system and apparatus of the type herein described where particularly the tape is stretched taut over a roller like the roller 13 when the impression is being made. It is necessary only that the material of the tape 12 be of such character that the undulating groove created by the stylus remains permanent. Inasmuch as the tape may be kept very narrow and thin, reels for a sufficient footage of the tape can be kept small. Accordingly an apparatus using this system can be housed within a casing or housing of extremely smaller compass than those heretofore employed wherein tape records have been made by other systems or processes. The entire operation can therefore be materially decreased in size and space while at the same time be constructed in a more simplified manner. Cost, therefore, of sound and vibration recording and reproducing systems of the type described is very substantially lower than recording and reproducing systems heretofore produced.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a vibration recording and reproducing system for preserving vibration characters on a tape of impressionable material, the combination of means for moving the tape past a recording station including an idler roller of friction surfaced material adapted to be positioned against one side of the tape, said roller having outside disks of relatively firm material and an intermediate disk portion between the outer disks, said intermediate disk portion being of material less firm and more easily depressed than the outside disks, a vibration responsive recording head and a stylus thereon adapted to vibrate whereby to impress upon the tape on the side opposite said intermediate portion a linearly continuous variable undulating pattern.

2. A vibration recording and reproducing system comprising a tape of transparent deformable material, means for moving the tape past a recording station comprising a pay-out reel, a take-up reel and an idler roller of depressible material positioned against one side of the tape, said roller having a circumferentially extending portion intermediate opposite edges adapted to engage the tape at a location intermediate opposite edges, said intermediate portion having a character more greatly deformable than remaining portions of the roller, and a vibration responsive recording head having a longitudinally vibrating stylus thereon adapted to press upon the tape in the area of the intermediate portion and on the side opposite said intermediate portion whereby to impress thereon a linearly continuous variable undulating pattern.

3. A vibration recording and reproducing system comprising a sheet of uncoated transparent deformable material with particles thereof having one effect on the passage of polarized light therethrough, means for progressively moving said sheet, a recording head adapted to vibrate in response to vibrations induced therein, said head having a stylus having a burnishing edge positioned with a uniform amount of pressure against the sheet on one side and adapted to impress on the sheet a progressively laterally variable undulating linearly continuous pattern, the particles of the material having said undulating linearly continuous pattern having an effect on the passage of polarized light therethrough different from the said one effect, at least one linear half of the pattern comprising a progressively variable area.

4. A vibration recording and reproducing system comprising a tape of uncoated transparent deformable material having particles having one effect on the passage of polarized light therethrough, means for moving the tape past a recording station comprising a pay-out reel, a take-up reel and a tape guide therebetween adapted to engage one side of the tape, a vibration responsive recording head at the recording station and a stylus thereon having a gently tapered free end having a burnishing edge, said stylus being adapted to be vibrated and to press with a uniform amount of pressure upon the tape on the side opposite said guide and to impress upon the tape a groove the longitudinal edges of which are linearly continuous and are progressively variable in a lateral direction corresponding to vibration of the stylus, the thickness of the tape between said longitudinal edges remaining substantially the same as the tape thickness outside said longitudinal edges.

5. A vibration recording and reproducing system comprising an uncoated sheet of a single layer of deformable material having particles having a selected light transmitting character in one orientation of the sheet, means for progressively moving said sheet in a direction parallel to the plane of the sheet, a recording head adapted to vibrate in response to vibrations induced therein, a stylus on said head having a burnishing edge positioned with a uniform amount of pressure against the sheet and adapted to deform the sheet into a continuous progressively laterally variable undulating linear pattern wherein at least one linear half of the pattern comprises a progressively variable area of particles having a light transmitting character different from the light transmitting character of the unburnished sheet and wherein the thickness of the sheet after deformation remains substantially the same as the thickness prior to deformation.

6. A vibration recording and reproducing system comprising an uncoated sheet having a single ply of transparent deformable material with particles initially having a selected polarized light transmitting character, means for progressively moving said sheet in a direction parallel to the plane of the sheet, a recording head adapted to vibrate in response to vibrations induced therein, a stylus on said head having a burnishing edge positioned with a uniform amount of pressure against the sheet on one side and adapted to impress on the sheet on only a portion thereof between the edges of the sheet a progressively continuous laterally variable undulating linear pattern, the particles of the material having said undulating linear pattern having a different polarized light transmitting character, at least one linear half of the pattern comprising an area variable progressively in area, and reproducing media operable with said sheet after impressions are produced thereon comprising a pair of polarizing plates having polar axes oriented in opposing directions and in parallel relationship to said sheet and on opposite sides thereof, and light means adapted to direct a beam of light through said plates and sheet, whereby the beam is obstructed by those portions of the sheet wherein the particles have one only of said polarized light transmitting characters and is projected through the sheet wherein the particles have the other of said polarized light transmitting characters.

7. A vibration recording and reproducing system comprising a single uncoated sheet of transparent deformable material with the particles thereof having a selected polarized light transmitting character in initial condition of the sheet, means for progressively moving said sheet comprising a moving support for said sheet, a recording head adapted to vibrate in response to vibrations induced therein, a stylus having a polished point on said head positioned with a uniform amount of pressure against the sheet on the side opposite said support and adapted to press upon a portion only of the sheet between the edges thereof in the area of said support and to impress thereon a progressively laterally variable continuous undulating linear pattern, the particles having said undulating linear pattern having a different polarized light transmitting character, at least one linear half of the pattern comprising an area variable progressively in size, and reproducing media operable with said sheet after impressions are produced thereon comprising a pair of polarizing plates having polar axes oriented in opposing directions and in parallel relationship to said sheet and on opposite sides thereof, and a photoelectric optical system including a light source adapted to project a light beam through the sheet and plates, whereby the light beam is obstructed except through that portion ofthe sheet where the particles have said selected polarized light transmitting character whereby to translate variations in the pattern through said optical system to another medium.

8. A vibration recording and reproducing system comprising a single ply tape of uncoated transparent deformable material having one effect on the passage of polarized light therethrough in initial condition, means for moving the tape past a recording station comprising a pay-out reel, a take-up reel and a tape guide positioned against one side of the tape, a vibration responsive recording head and a laterally vibrating stylus having a burnishing edge thereon adapted to press with a uniform amount of pressure upon the tape on the side opposite said tape guide and to impress thereon a laterally variable undulating continuous linear pattern, the particles of material having said linear pattern having an effect on the passage of polarized light different from that of the material before the pattern is impressed thereon, and a reproducing media operable with said sheet after said pattern is impressed thereon comprising a mask having an opening therein positioned to expose one side only of the pattern, a light-sensitive system operable with the tape after impressions are produced thereon having a position projecting through the opening of the mask and through that portion of the tape on which the linear pattern is impressed, and a pair of polarizing plates having polar axes in opposing directions located in the axis of the optical system and on opposite sides whereby to vary impulses generated in the light-sensitive system in response to variations in the portion of the pattern opposite said opening.

9. A vibration recording and reproducing system comprising a single ply tape of uncoated transparent deformable plastic material wherein the particles have one effect upon the passage of polarized light therethrough, means for moving the tape past a recording station comprising a pay-out reel, a take-up reel and an idler roller positioned against one side of the tape, said roller having an intermediate portion located intermediate opposite edges of the tape, a vibration responsive recording head and a laterally vibrating stylus having a burnishing edge thereon adapted to press with a uniform amount of pressure upon the tape on the side opposite said intermediate portion and in the area of the intermediate portion and to impress thereon a laterally variable continuous undulating linear pattern, particles of tape material having said variable undulating linear pattern being shifted to a position having a different effect upon the passage of polarized light therethrough, and a reproducing media operable with said sheet after said pattern is impressed thereon comprising a mask having an opening therein positioned to expose one side only of the pattern, a photoelectric optical system operable with the tape after impressions are produced thereon and having a source of light in a position projecting a light beam through the opening of the mask and through the portion of the tape wherein the particles are in said position having a different effect upon the passage of polarized light therethrough, and a pair of polarizing plates having polar axes in opposing directions and located one on each side of the tape whereby to translate variations in the portion of the pattern opposite said opening to another medium.

10. A vibration recording system comprising a single ply tape of uncoated plastic deformable material having a selected light transmitting character, means for moving the tape past a recording station comprising a pay-out reel, a take-up reel and a tape guide therebetween adapted to engage one side of the tape, a vibration responsive recording head at the recording station and a stylus thereon, a gently tapered free end on the stylus having a rounded burnishing edge, said stylus being adapted to be vibrated and to press with a uniform amount of pressure into the tape on the side opposite said guide thereby to deform a portion of the tape material into a linear continuous groove of progressively laterally variable width corresponding to vibrations of the stylus and of substantially uniform thickness, the material in the groove after passage of the stylus having a light transmitting character different from that of the material before burnishing.

11. A vibration recording and reproducing system comprising a tape of uncoated plastic transparent deformable material which normally has one effect on the passage therethrough of polarized light, means for moving the tape past a recording station comprising a pay-out reel, a take-up reel and a tape guide therebetween adapted to engage one side of the tape, a vibration responsive recording head at the recording station and a stylus thereon having a gently tapered free end having a burnishing edge, said stylus being adapted to be vibrated and to press with a uniform amount of pressure upon the tape on the side opposite said guide and to impress upon the tape a continuously linear groove of progressively laterally variable width corresponding to vibrations of the stylus, the tape material in said groove having substantially the same thickness as the remainder of the tape, the material in said groove after formation thereof having another effect on the passage therethrough of polarized light, and a reproducing media comprising a light-sensitive system operable with the tape after impressions are produced thereon comprising a pair of polarizing plates having polar axes in opposing directions, said plates being located one on each side of the tape, a light source and a receiver adapted to receive light from said source which passes only through those portions of the tape wherein the groove has been impressed in amounts varied in accordance with variations in the width of the groove on the tape.

12. A vibration recording and reproducing system comprising a tape of uncoated transparent deformable material having one effect on the passage of polarized light therethrough in initial condition, means for moving the tape past a recording station comprising a pay-out reel, a take-up reel and an idler roller therebetween adapted to engage one side of the tape, a vibration responsive recording head at the recording station and a stylus thereon having equal opposite sides extending inwardly at an obtuse angle to a blunt rounded point, said stylus being adapted to be vibrated and to press with a uniform amount of pressure upon the tape on the side opposite said roller thereby to impress on the tape a linearly continuous groove of progressively laterally variable width corresponding to vibrations of the stylus, wherein the thickness of the tape within the groove is substantially the same as the thickness prior to being pressed into groove form, particles of material in the groove having a different effect upon the passage of polarized light therethrough, and a reproducing media comprising a photoelectric optical system operable with the tape after impressions are produced thereon comprising a pair of polarizing plates having polar axes in opposing directions, said plates being located one on each side of the tape, a light source and a photoelectric cell adapted to receive light from said source which passes through those portions of the tape only wherein the material has one of the two identified effects upon the passage of polarized light therethrough in amounts varied in accordance with variations in the width of the groove on the tape.

References Cited in the file of this patent

UNITED STATES PATENTS

| | | |
|---|---|---|
| 623,569 | Sedgwick | Apr. 25, 1899 |
| 1,222,029 | Quigley | Apr. 10, 1917 |
| 1,350,246 | Steiger | Aug. 17, 1920 |
| 2,224,170 | Von der Meulen | Dec. 10, 1940 |
| 2,497,142 | Shepherd | Feb. 12, 1950 |

FOREIGN PATENTS

| | | |
|---|---|---|
| 780,132 | France | Apr. 19, 1935 |

OTHER REFERENCES

Recording and Reproduction of Sound, Read (pages 72 and 119).